United States Patent [19]

Calley

[11] Patent Number: 4,767,939
[45] Date of Patent: Aug. 30, 1988

[54] WIND DRIVEN ELECTRIC CURRENT PRODUCER

[76] Inventor: David G. Calley, Rte. 8, Box 51, LRB, Flagstaff, Ariz. 86004

[21] Appl. No.: 60,024

[22] Filed: Jun. 9, 1987

[51] Int. Cl.[4] .............................. H02P 9/04; F03D 9/00
[52] U.S. Cl. ........................................ 290/55; 290/44; 416/10
[58] Field of Search .................... 290/55, 44, 54, 43; 416/10, 13, 11, 142, 148

[56] References Cited

U.S. PATENT DOCUMENTS

| | | | |
|---|---|---|---|
| 2,026,828 | 1/1936 | Dunn | 290/55 |
| 2,048,732 | 7/1936 | Dunn | 290/55 |
| 2,052,816 | 9/1936 | Dunn | 290/55 |
| 2,055,012 | 9/1936 | Jacobs | 290/55 |
| 2,094,917 | 10/1937 | Dunn | 290/55 |
| 2,140,152 | 12/1938 | Dunn | 290/55 |
| 2,153,523 | 4/1939 | Roberts et al. | 290/55 |
| 2,177,801 | 10/1939 | Erren | 290/55 |
| 2,204,462 | 6/1940 | Albers | 290/55 |
| 2,207,964 | 7/1940 | Albers | 290/55 |
| 2,245,264 | 6/1941 | Dunn | 290/55 |

FOREIGN PATENT DOCUMENTS 0128471  8/1983  Japan ................................ 290/55

Primary Examiner—William M. Shoop, Jr.
Assistant Examiner—Sharon D. Logan
Attorney, Agent, or Firm—Carl M. Lewis

[57] ABSTRACT

A wind-driven electric current-producer has a magnetic field producing alternator rotor directly driven by an air turbine blade. The alternator and blade together are mounted on a vertically tiltable control frame which is pivotably mounted on a main frame that swivels with the wind direction in response to a guide vane. In high winds the blade and alternator tilt upward but continue to aim into the wind and produce current. The guide vane is low to accomodate the tilted blade path. The location of the pivot causes gravitational forces to tilt the control frame in both directions. Springs counterbalance the upward tilting forces. The spring mounts have a stop that limits the tilt in both directions.

12 Claims, 1 Drawing Sheet

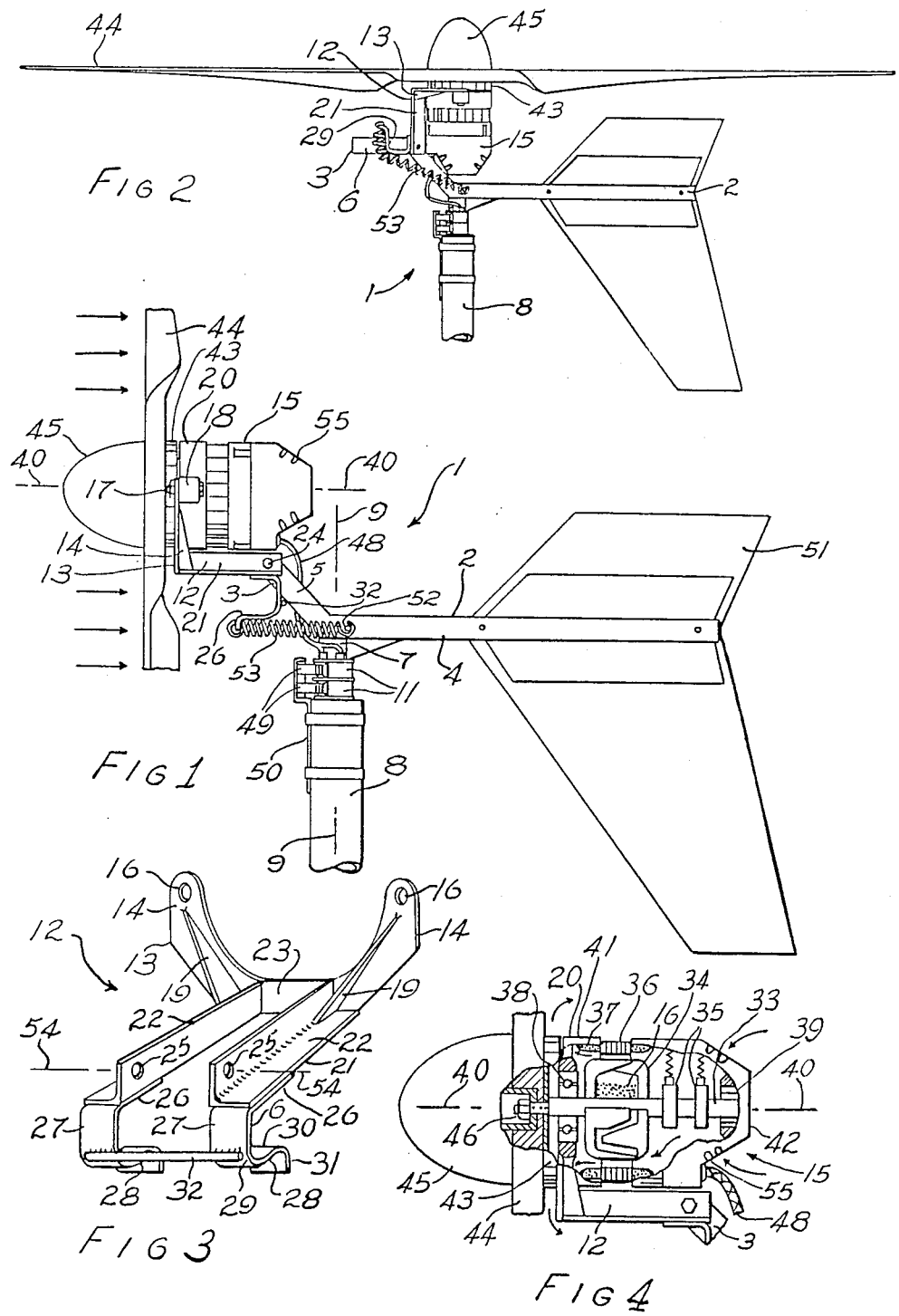

WIND DRIVEN ELECTRIC CURRENT PRODUCER

SUMMARY OF THE INVENTION

This invention relates to a wind-driven electric current-producing apparatus wherein an alternating current producer, hereinafter referred to as an alternator is directly-driven by a wind turbine blade without speed increasing gears to increase the speed of the alternator above the speed of the wind turbine blade speed.

In order that a directly-driven alternator may provide efficient current production at low wind operating speeds it is desirable to use a high efficiency alternator and wind turbine blade design. Another feature of this invention is to provide novel apparatus for controlling the output from the wind turbine blade and thus controlling the current from the directly connected alternator by mounting the alternator and wind turbine blade on a special control frame which in turn is mounted on a swivel frame whose direction is controlled by a novel guide vane which extends primarily downwardly so as to accommodate maximum control by said control frame.

By pivoting of the control frame about a pivot axis both the alternator and the wind turbine blade are controllably turned with respect to the wind speed.

Another feature of this invention is to provide a design which allows the alternator to continue to operate and provide substantially full current output even during excessive wind conditions of both an intermittent or continuous order. Another feature is to provide a novel wind-driven electric current-producing apparatus that is simple in structure, durable, and low in initial and operating costs.

BRIEF DESCRIPTION OF THE DRAWINGS

FIG. 1 is a side elevational view of the preferred wind-driven electric current-producing apparatus wherein the wind turbine blade and alternator thereof are positioned to accommodate normal and low wind conditions. Tip portions of the wind turbine blade have been deleted for drawing space reasons.

FIG. 2 is a side elevational view of the preferred wind-driven electric current-producing apparatus slightly reduced in size showing the full length wind turbine blade wherein the wind turbine blade and alternator thereof are positioned to accommodate the absolute maximum wind conditions.

FIG. 3 is an enlarged perspective of the control frame alone generally viewed from the rear.

FIG. 4 is an enlarged side elevational view primarily showing the alternator and wind turbine blade of FIG. 1, with portions thereof broken away disclosing the rotating magnetic field-producing rotor and turbine wind turbine blade both mounted on the same shaft rotatably supported by the same bearings.

DESCRIPTION OF THE PREFERRED EMBODIMENT

Identical elements are identified by identical reference signs throughout the drawings. In general this description continuously refers to all the Figures of the drawings unless special reference is made.

The preferred embodiment of the wind-driven electric current-producing apparatus 1 includes a swivel frame 2 formed of tubular steel having a rectangular cross section. Swivel frame 2 has a horizontal rear portion 4 extending rearwardly down wind and a front portion 3, a portion 5 of which is inclined and a portion 6 of which is elevated and horizontal. The various portions may be cut from tubing and welded together to form swivel frame 2. Swivel frame 2 also has a swivel pin 7 located and attached at the juncture of inclined portion 5 and rear portion 4 as by welding. Swivel pin 7 extends downwardly into and is supported by vertical pipe 8 to allow swivel pin and thus swivel frame 2 to swivel freely about a vertical swivel axis 9. A pair of slip rings 11 are electrically insulated from but supported on swivel pin 7 for rotation therewith.

Mounted on the front portion 3 of swivel frame 2 is a control frame 12 shown more specifically in FIG. 3. Control frame 12 has a first U-Shaped portion 13 the upwardly extending legs 14 of which straddle and support alternator 15 fastened thereto as by bolts 17 extending through holes 16 into the mounting lugs 18 (only one visible) protruding from opposite sides of the front end bell 41 of housing or frame 20 of alternator 15. Swivel frame 2 also has a second U-Shaped portion 21 the rearwardly extending legs 22 of which straddle the horizontal portion 6 of the front portion 3 of swivel frame 2. Legs 22 and the area 23 common to both U-Shaped portions are constructed of steel strip having a cross section conforming to a right angle to provide strength. A pair of reinforcing members 19 welded between legs 14 and legs 22 further increases the rigidity of control frame 12. Control frame 12 is pivotally supported by swivel frame 2 for relative movement about a pivot axis 54 as by a bolt 24 extended horizontally through holes 25 in legs 22 and swivel frame 2 at the intersection of the horizontal portion 6 and the inclined portion 5 thereof. As seen in FIG. 1, pivot bolt 24 is directly below alternator 15 and is spaced from housing 20 a distance substantially equal to one tenth the vertical dimension of alternator 15. Bolt 24 serves as a pivot and is not tightened so firmly as to clamp legs 22 fixedly against swivel frame 2.

At the rear portion of each of legs 22 there is fastened at the bottom side thereof as by welding a steel strip or arm 26 which extends vertically downwardly at 27 and then gradually extends through a large radius at 29 forwardly at 30 to a distal portion 31 which more abruptly turns downwardly where it terminates. Each distal portion 31 is provided with a hole 28 for connecting a tension spring 53 thereto. Extending horizontally between and fastened as by welding to arms 26 at the upper part of the large radius 29 is a steel rod 32.

Alternator 15 has a single drive shaft 33 which carries a magnetic field-producing rotor 34 with windings 16 and wind turbine blade 44 both mounted for rotation therewith. Rotor shaft 33 also carries a pair of slip rings 35 electrically connected to the rotor windings 16. Slip rings 35 are electrically insulated from shaft 33 and are contacted by a pair of spring biased carbon brushes 35 for passing electric current to the rotor 34 whereby a rotating field is produced by said rotor during operation. Rotor 34 is axially positioned to rotate within armature stator 36 having a stator winding 37 for producing alternating current.

The shaft 33 is supported for rotation about a rotor axis 40 by a permanently lubricated ball bearing assembly 38 disposed adjacent the alternator front end and at the rear end by a permanently lubricated roller bearing assembly 39. Bearing assembly 38 is press fitted into the front aluminum end bell 41 and bearing assembly 39 is press fitted into aluminum rear end bell 42. The lightweight aluminum end bells 41 and 42 and close proximity of pivot bolt 24 to the center of gravity of the alternator 15, wind turbine blade 44 and control frame 12, all permit the assembly of these elements to move between the extreme positions shown in FIGS. 1 and 2 about pivot axis 54 with very little rotational inertia.

Mounting lugs 18 are an integral part of and protrude laterally from opposite sides of end bell 41. The front and rear end bells 41 and 42 with a portion of the plates of stator 36 are bolted together to form the alternator housing or frame 20.

Forward of bearing 38, shaft 33 supports for rotation therewith a centrifugal blower 43 for drawing cooling air through apertures 55 in end bell 42 in a direction from right to left between stator 36 and rotor 34 in FIGS. 1 and 4. Thus the cooling air moves through the interior of the alternator in a direction opposite from the air passed over the exterior of alternator by the wind turbine blade 44 as indicated by the arrows in FIGS. 1 and 4. A lightweight wind turbine blade 44 formed of fiberglass is fastened by appropriate means with a nut 46 on a threaded portion of the front end of rotor shaft 33 so that blade 44 operates in a plane normal to shaft 33. The wind turbine blade 44 thus directly drives the rotor 34, i.e. without the use of speed increasing gears. A wind turbine blade hub 45 is disposed forward of blade 44 to effeciently direct the air flow adjacent the center of the blade and over the alternator housing 20.

The current output produced by the stator winding 37 is passed to flexible output wires 48 electrically connected to slip rings 11 on swivel pin 7. Pole 8 supports a pair of brushes 49 spring biased to contact the slip rings 11 for transfering electric current to a stationary wire 50 to the alternator load not shown.

To the lower rear portion 4 of swivel frame 2 is attached a primarily downwardly extending generally flat V-Shaped guide vane 51 formed of heavy gauge steel sheet metal for directing the front portion 3 of swivel frame 2 into the wind. It should be noted that in FIG. 1, the upper leg of the V of planar guide vane 51 does not extend above rotor axis 40 which always is maintained in the same plane as guide vane 51. It will be seen that the wind turbine blade 44 does not interfere with guide vane 51 when control frame 12 and alternator 15 are positioned as seen in FIG. 2.

Also supported by swivel frame 2 is a rod 52 which extend laterally outwardly from each side of swivel frame 2 just above swivel pin 7. On each side of swivel frame 2 is a separate tension spring 53 (only one shown) which is fastened at one end in the hole 28 of an arm 26 and at the other end to a protruding end portion of rod 52. It will be understood that the weight of the alternator 15, wind turbine blade 44 and control frame 12 each of which has a center of gravity which along with the force of springs 53 normally serve to bias the alternator 15, wind turbine blade 44 and control frame 12 to pivot to the low wind position shown in FIG. 1.

During normal operation of the preferred embodiment, the guide vane 51 serves to direct the swivel frame 2 and thus the wind turbine blade 44 into the wind whereby the wind turbine blade is caused to rotate thereby through shaft 33 rotating the magnetic field of rotor 34 causing an alternating current to flow in the windings 37 of armature stator 36. The alternator current is delivered by flexible wire 48 to slip rings 11 from whence it flows through brushes 49 and stationary wire 50 to the load.

As the wind increases the wind turbine blade speed of rotation will increase causing an increase in the rotation of the magnetic field of the alternator with a consequent increase in current produced.

To limit the speed of the magnetic field and/or wind turbine blade 44, I have positioned pivot bolt 24 (as in FIG. 1) rearward of the low wind operating plane of the wind turbine blade 44 and below the rotor axis 40. As the wind increases the wind turbine blade 44 exerts an axial thrust on the rotor shaft 33 producing a rotational bias or torque on the alternator 15 and control frame 12 assembly tending to bias the assembly upward toward the position shown in FIG. 2.

As above described the gravitational forces of the wind turbine blade 44, alternator 15, and control frame 12 produce a downward counter bias. The center of gravity of each of the wind turbine blade 44, alternator 15, and hub 45 substantially lie on the rotor axis 40. As the wind increases causing the assembly to move toward the position of FIG. 2, the rotational biasing caused by gravitational forces decrease as the centers of gravity pass over pivot bolt 24 and actually a reverse rotational bias thereby results to assist the wind forces biasing the assembly toward the position shown in FIG. 2.

Thus as a consequence of locating the pivot bolt, the assembly will move very quickly to the high wind position when excessive winds are encountered thereby reducing the potential damage to the wind turbine blade, rotor windings etc. while continuing to allow the alternator to produce about eighty five percent of maximum operating power.

In the extreme position of FIG. 2 the centers of gravity of the hub 45, wind turbine blade 44 and alternator 15 lie substantially on the swivel axis 9. To control these biasing forces and provide a means to return the assembly quickly toward the position of FIG. 1, the bias of the springs 53 increases as the assembly moves from the low wind position of FIG. 1 to the high wind position of FIG. 2. To provide additional spring bias as the position of FIG. 2 is approached, arms 26 are provided with curved portions 29 over which the springs are partially wrapped.

To permit the alternator to operate in the high wind position of FIG. 2, it will be noted that the upper portion of the V-Shaped generally flat guide vane 51 terminates slightly below the rotor axis 40 in the low wind position so as not to intersect the horizontal operating plane of the wind turbine blade 44 in the high wind position shown in FIG. 2.

It will be noted in FIG. 2 that the steel rod 32 carried by arms 26 of control frame 12 abuts the lower portion of the horizontal portion 6 of elevated front portion 3 of swivel frame 2 thereby providing a pivot upper limit stop for high wind conditions. The same rod 32 provides a pivot lower limit pivot stop by abutting the lower side of the inclined portion 5 of swivel frame 2 as seen in FIG. 1.

The preferred embodiment of my invention avoids the use of high rotating inertia and friction of speed increasing drive gears. It avoids the use of high rotational inertia of a rotating armature. It avoids the use of costly levers, air deflecting surfaces, and blade feathering gears to cope with high wind conditions. Moreover neither the wind turbine or the guide vane deviate horizontally from their normal operating direction in order to cope with high wind conditions. Nor does the manner in which my preferred embodiment cope with high wind conditions prevent it during such time from producing substantially full electric output.

The low rotational inertia of the assembly of alternator, wind turbine blade, and control frame about the pivot axis due to lightweight aluminum end bells and the close proximity of the pivot bolt to the center of gravity of these assembly elements, permit the assembly to move quickly in and out of the high wind position. The low rotational inertia of the lightweight turbine blade and direct drive permit my preferred embodiment to be responsive to and take advantage of short light puffs of wind that might otherwise be ignored by high inertia apparatus.

Because of the simple structures and the use of readily available mass produced parts and ease of assembly, the cost of manufactured is low. My preferred embodiment is thus highly efficient, very responsively controlled and low in cost.

In the foregoing specification many references have been made to spational relationships shown in the drawings that can only exist when the preferred embodiment is assembled and placed in operation position. However it is contemplated that the claims to follow will include spatial relationships that do not exist until the apparatus is assembled in operating position. The spatial relationships present in the claims are intented to mean the relationship that would exits if the apparatus is placed in operating condition and are not intended to constitute a limitation requireing the apparatus to be in an assembled operating condition.

Having described the preferred embodiment of my invention, I contemplate that many changes may be made without departing from the scope and spirit of the invention as defined by the following claims.

I claim:

1. A wind-driven electric current-producing apparatus comprising: a swivel frame adapted to swivel about a substantially vertical axis and having a front portion for extending forwardly into the wind and a rear portion for extending rearwardly downwind from said front portion; a guide vane connected to said swivel frame for guiding said swivel frame with respect to the direction of wind flow; an alternator carried on said swivel frame and having a rotor shaft; a magnetic field producing rotor supported on said shaft for rotation about a rotor axis; a wind turbine blade mounted at one end of said rotor shaft to directly drive said rotor; control means for variably limiting the rotational speed of said magnetic field; said alternator further including an aluminum front end bell disposed adjacent to said wind turbine blade, an aluminum rear end bell disposed adjacent the end of said rotor shaft remote from said wind turbine blade, and a bearing assembly disposed in and supported by each of said end bells for rotatably supporting said rotor shaft; and a centrifugal blower mounted on said rotor shaft for rotation with said rotor shaft and disposed axially intermediate said front end bell and said wind turbine blade for drawing cooling air through said alternator in a direction opposite to the wind passing said wind turbine blade and over the exterior of said alternator.

2. A wind-driven electric current-producing apparatus comprising: a swivel frame adapted to swivel about a substantially vertical axis and having a front portion for extending forwardly into the wind and a rear portion for extending rearwardly from said front portion; a guide vane connected to said swivel frame for guding said swivel frame with respect to the direction of wind flow; an alternator carried on said swivel frame and having a rotor shaft; a magnetic field producing rotor supported on said shaft for rotation about a rotor axis; a wind turbine blade mounted at one end of said rotor shaft to directly drive said rotor; control means for variably limiting the rotational speed of said magnetic field; said control means including a control frame connected to support said alternator; a pivot for pivotally connecting said control frame to said swivel frame for pivotal movement about a pivot axis; said control frame further including a first U-shaped portion the legs of which straddle and are connected rigidly to said alternator and a second U-shaped portion the legs of which straddle and are connected to said front portion of said swivel frame; and wherein said pivot axis extends through the legs of said second U-shaped portion of said control frame.

3. The apparatus as defined by claim 2 wherein said pivot is a horizontally extending bolt disposed directly below said alternator when in a low wind position.

4. A wind-driven electric current-producing apparatus comprising: a swivel frame adapted to swivel about a substantially vertical axis and having a front portion for extending forwardly into the wind and a rear portion for extending rearwardly downwind from said front portion; a guide vane connected to said swivel frame for guiding said swivel frame with respect to the direction of wind flow; an alternator carried on said swivel frame and having a rotor shaft; a magnetic field producing rotor supported on said shaft for rotation about a rotor axis; a wind turbine blade mounted at one end of said rotor shaft to directly drive said rotor; control means for variably limiting the rotational speed of said magnetic field including a control frame connected to support said alternator; a pivot for pivotally connecting said control frame to said swivel frame for pivotal movement about a pivot axis; said pivot axis being spaced from said rotor shaft wherein the axial thrust exerted by said wind turbine blade on said rotor shaft biases said alternator and control frame about said pivot tending to pivot said alternator and control frame in one direction; biasing means for biasing said alternator and control frame about said pivot axis in an opposite direction; said biasing means including a tension spring extending between said control frame and said swivel frame; one of said control frame and said swivel frame includes a curved arm connected to one end of said spring and disposed adjacent said spring in interfering relationship with said spring whereby upon pivoting of said control frame and swivel frame relative to each other in the direction to extend said spring, said spring is partially wrapped over said arm.

5. The apparatus as defined by claim 4 including a second arm and a second spring, said arms extending from said control frame on opposite sides of said front portion of said swivel frame; and said springs being positioned on opposite sides of said of said front portion of said swivel frame.

6. The apparatus as defined by claim 5 including a rod connected to and extending between said arms to serve as a stop to limit pivoting of said control frame.

7. The apparatus as defined by claim 6 wherein said front portion of said swivel frame includes a horizontal portion and an inclined portion; and said rod is positioned to serve as a stop to limit downward pivoting of said control frame by abutting said inclined portion and as a stop to limit upward pivoting of said control frame by abutting said horizontal portion of said swivel frame.

8. A wind-driven electric current-producing apparatus comprising: a swivel frame adapted to swivel about a substantially vertical axis; a control frame pivotally mounted on said swivel frame for relative pivotal movment about a substantially horizontal pivot axis; an alternator mounted on said control frame; said control frame being pivotable from a first extreme position for low and normal wind speed conditions and a second extreme position for maximum wind speed conditions; said alternator including a rotor shaft extending from the forward end thereof; a blower mounted on said rotor shaft adjacent said forward end for cooling said alternator; a wind turbine blade mounted on said rotor shaft adjacent said blower for directly driving said blower.

9. The apparatus as defined by claim 8 including a hub disposed forward of said wind turbine blade for controlling air flow adjacent said blower.

10. A wind-driven electric current-producing apparatus comprising: a swivel frame adapted to swivel about a substantially vertical axis; an alternator supported by said swivel frame having a housing and a rotor shaft extending from said housing; a wind turbine blade mounted on said rotor shaft for rotation therewith; said rotor shaft and said wind turbine blade being mounted for rotation about a rotor shaft axis; and a blower mounted on said rotor shaft between said wind turbine blade and said alternator housing for passing cooling air through said alternator housing generally in a direction toward said wind turbine blade.

11. The apparatus as defined by claim 10 wherein said alternator housing includes front and rear aluminum end bells; said front end bell being disposed intermediate said wind turbine blade and said rear end bell; mounting lugs integral with and protruding from the side of said front end bell; bolt means for fastening said alternator housing to a frame and extending through at least one of said mounting lugs in a direction substantially parallel to the axis of rotation of said wind turbine blade.

12. A wind-driven electric current-producing apparatus comprising a swivel frame adapted to swivel about a substantially vertical axis; a guide vane supported by said swivel frame; an alternator supported by said swivel frame having a housing and a rotor shaft extending through said housing; said housing including front and rear non-magnetic end bells; a wind turbine blade mounted closest to said front end bell on said rotor shaft for driving said rotor shaft about an axis of rotation common to said wind turbine blade and said rotor shaft; at least one mounting lug integral with and protruding from the side of said front end bell; and at least one bolt for supporting said alternator housing extending from said mounting lug in a direction parallel to the axis of rotation common to said wind turbine blade and said rotor shaft.

* * * * *